(12) United States Patent
Byrne

(10) Patent No.: US 11,502,941 B2
(45) Date of Patent: Nov. 15, 2022

(54) TECHNIQUES FOR ROUTING DATA IN A NETWORK

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/112,769

(22) Filed: Dec. 4, 2020

(65) Prior Publication Data
US 2022/0182310 A1   Jun. 9, 2022

(51) Int. Cl.
| | | |
|---|---|---|
| *H04L 12/707* | (2013.01) |
| *H04L 45/00* | (2022.01) |
| *H04L 45/745* | (2022.01) |
| *H04L 49/25* | (2022.01) |
| *H04L 41/0677* | (2022.01) |
| *H04L 61/2592* | (2022.01) |
| *H04L 49/90* | (2022.01) |

(52) U.S. Cl.
CPC ......... *H04L 45/22* (2013.01); *H04L 41/0677* (2013.01); *H04L 45/745* (2013.01); *H04L 49/25* (2013.01); *H04L 49/90* (2013.01); *H04L 61/2592* (2013.01)

(58) Field of Classification Search
CPC ... H04L 45/22; H04L 41/0677; H04L 45/745; H04L 49/25; H04L 49/90; H04L 61/2592; H04L 49/3027; H04L 47/10; H04L 45/28; H04L 45/60; H04L 45/02; H04L 41/0663; H04L 12/50; H04L 43/045;
(Continued)

(56) References Cited

U.S. PATENT DOCUMENTS

| | | | |
|---|---|---|---|
| 6,252,849 B1 * | 6/2001 | Rom | H04L 47/263 370/417 |
| 7,065,050 B1 * | 6/2006 | Herbst | H04L 49/3072 370/235 |
| 10,355,981 B1 * | 7/2019 | Matthews | H04L 45/302 |
| 2015/0172097 A1 * | 6/2015 | Melman | H04L 45/22 370/225 |

(Continued)

OTHER PUBLICATIONS

Atlas, A. et al; Basic Specification for IP Fast Reroute: Loop-Free Alternates; Network Working Group; Alcatel-Lucent; Sep. 2008 (31 pages).

(Continued)

*Primary Examiner* — Wutchung Chu
(74) *Attorney, Agent, or Firm* — Lee & Hayes, P.C.

(57) ABSTRACT

A router in a switching network has input interfaces communicatively coupled to other routers and first and second output interfaces communicatively coupled to other routers in the switching network. First and second output interface queues, respectively associated with the first and second output interfaces, store data packets awaiting transmission respectively on the first and second output interfaces. A routing table maps first and second destination addresses to the first output interface as a primary interface and maps the first destination address to the second output interface as an alternate interface. A route controller assigns, using the routing table, data packets having one of the first or second destination address to the primary output interface for transmission, the primary output interface being the first output interface. The controller monitors the first output interface queue and determines whether to activate an alternate route for transmitting data packets having the first destination address over the switching network.

20 Claims, 4 Drawing Sheets

(58) Field of Classification Search
CPC ..... H04L 12/5601; H04L 45/00; H04L 12/28; H04L 29/06; H04L 49/254; H04N 19/436; G06F 13/1684; G06F 3/165; G06F 9/461; G06F 3/14; G06F 11/20; G06F 11/2017; G06F 13/122; G06F 13/34; G06F 13/14; G06F 13/385; G06F 15/16; H04Q 11/0066; H04Q 3/0025; H04Q 11/0062; H04Q 3/68; G06N 3/10
See application file for complete search history.

(56) References Cited

U.S. PATENT DOCUMENTS

| | | | |
|---|---|---|---|
| 2015/0350061 A1* | 12/2015 | Chunduri | H04L 45/18 370/228 |
| 2016/0135075 A1* | 5/2016 | Wigren | H04W 28/12 370/235 |
| 2016/0315881 A1* | 10/2016 | Pierson | H04L 49/35 |
| 2017/0126545 A1 | 5/2017 | Yi | |
| 2017/0346726 A1* | 11/2017 | Menon | H04L 43/0811 |
| 2018/0123869 A1 | 5/2018 | Singh et al. | |
| 2018/0212860 A1 | 7/2018 | White et al. | |
| 2019/0310937 A1* | 10/2019 | Bachmutsky | H04L 49/109 |

OTHER PUBLICATIONS

Bryant, S. et al, Remote Loop-Free Alternate (LFA) Fast Reroute (FRR), Internet Engineering Task Force, ISSN: 2070-1721; Apr. 2015 (29 pages).

* cited by examiner

TECHNIQUES FOR ROUTING DATA IN A NETWORK

BACKGROUND

Traffic congestion causes problems in packet-switched networks. For example, congestion may cause data packets to be dropped, which can reduce network performance and quality of service. Dropped packets are more problematic for some types of data than for others. For example, the quality of streaming video and/or audio is particularly susceptible to dropped packets because they cause noticeable interruptions video and/or audio stream, which hurts the customer experience.

Networks apply different strategies to deal with congestion. One technique is known as active queue management. In this technique, described in RFC 7490, when congestion occurs at a network node, such as due to a downstream network topology change, the node stores packets in a queue until they can be sent along to their destination.

Eventually, however, the queue fills, overflows, starts dropping packets. At this point, the node determines that the link has failed. After realizing the link has failed, the node begins to reroute traffic from the failed link to an alternate link available to the node. The alternate link is a loop-free alternate route (LFA), meaning that the next node on the alternate link has available an alternate path to the destination that does not requiring returning to the same node that has the failed link.

Although such techniques help networks handle congestion, they also have certain drawbacks. For example, these techniques are reactive, rather than proactive, with respect to a link failure because they wait until a link has failed before rerouting traffic. As a result, packets are dropped, which reduces performance, quality of service, and customer experience.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
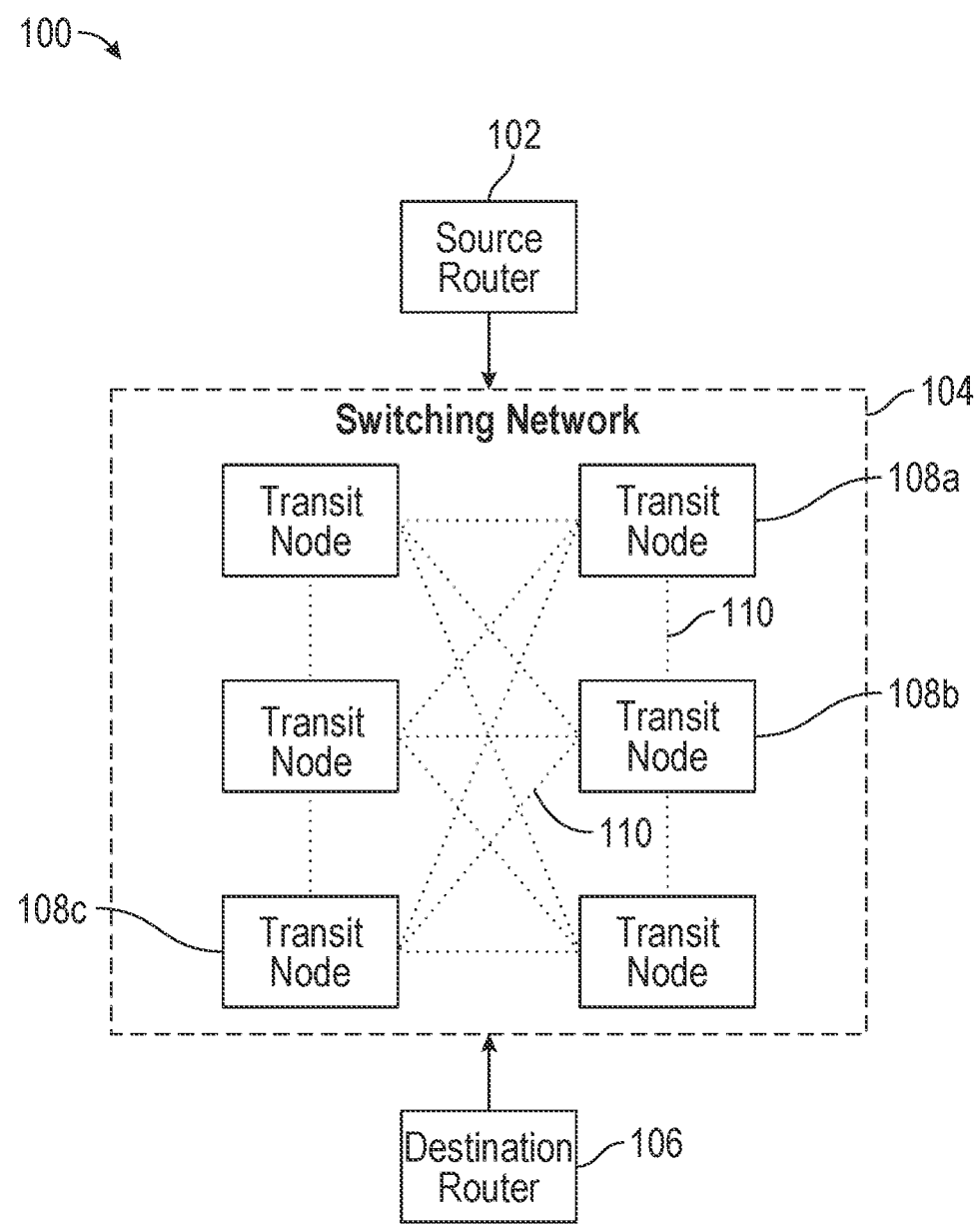
FIG. 1 illustrates an example network, including a switching network having a plurality of routers.

An aspect of this disclosure is directed to a router in a switching network. The router may include one or more input interfaces communicatively coupled to respective one or more other routers in the switching network and first and second output interfaces communicatively coupled to respective first and second other routers in the switching network. The router may further include first and second output interface queues respectively associated with the first and second output interfaces, the first and second output interface queues being configured to store data packets awaiting transmission respectively on the first and second output interfaces. A routing table may map first and second destination addresses to the first output interface as a primary output interface and mapping the first destination address to the second output interface as an alternate output interface. Additionally, a route controller of the router may be configured to receive, from the one or more input interfaces, data packets having one of the first destination address or the second destination address. The controller may assign, using the routing table, the data packets having one of the first destination address or the second destination address to the primary output interface for transmission on the switching network, the primary output interface being the first output interface. Additionally, the router may monitor a data storage status of the first output interface queue and may determine, based on the monitored status, whether to activate an alternate route for transmitting data packets having the first destination address over the switching network, the alternate route using the alternate output interface instead of the primary interface, the alternate output interface being the second output interface.

Another aspect is directed to a method for routing data in a switching network. The method may include communicatively coupling one or more input interfaces of the router to respective one or more other routers in the switching network and communicatively coupling first and second output interfaces of the router to respective first and second other routers in the switching network. Additionally, the method may include providing first and second output interface queues respectively associated with the first and second output interfaces, the first and second output interface queues being configured to store data packets awaiting transmission respectively on the first and second output interfaces. Additionally, the method may include providing a routing table mapping first and second destination addresses to the first output interface as a primary output interface and mapping the first destination address to the second output interface as an alternate output interface. The method may include receiving, from the one or more input interfaces, data packets having one of the first destination address or the second destination address. The method may include assigning, using the routing table, the data packets having one of the first destination address or the second destination address to the primary output interface for transmission on the switching network, the primary output interface being the first output interface. Additionally, the method may include monitoring a data storage status of the first output interface queue; and determining, based on the monitored status, whether to activate an alternate route for transmitting data packets having the first destination address over the switching network, the alternate route using the alternate output interface instead of the primary interface, the alternate output interface being the second output interface.

Another aspect is directed a computer-readable storage medium storing instructions that, when executed by a processor, cause the processor to perform a method of routing data in a switching network. The method may include communicatively coupling one or more input interfaces of the router to respective one or more other routers in the switching network and communicatively coupling first and second output interfaces of the router to respective first and second other routers in the switching network. Additionally, the method may include providing first and second output interface queues respectively associated with the first and second output interfaces, the first and second output interface queues being configured to store data packets awaiting transmission respectively on the first and second output interfaces. Additionally, the method may include providing a routing table mapping first and second destination addresses to the first output interface as a primary output interface and mapping the first destination address to the second output interface as an alternate output interface. The method may include receiving, from the one or more input interfaces, data packets having one of the first destination address or the second destination address. The method may include assigning, using the routing table, the data packets having one of the first destination address or the second destination address to the primary output interface for transmission on the switching network, the primary output interface being the first output interface. Additionally, the method may include monitoring a data storage status of the first output interface queue; and determining, based on the monitored status, whether to activate an alternate route for transmitting data packets having the first destination address over the switching network, the alternate route using the alternate output interface instead of the primary interface, the alternate output interface being the second output interface.

FIG. 1 depicts a system diagram of an exemplary network 100. The network 100 may include a source router 102, a switching network 104, and a destination router 106. The network 100 may implement any suitable packet-switching protocol, such as Internet Protocol (IP), to transmit packets from the source router 102, through the switching network 104, to the destination router 106.

The source router 102 may be, for example, a multiprotocol label-switching (MPLS) IP router or another suitable type of network router. The source router 102 may be communicatively coupled to, and configured to serve, a set of one or more source terminal devices (not shown), such as user equipment (UE), content servers, or other such network endpoints. Likewise, the destination router 106 may have the same or a similar configuration as the source router 102 and may be communicatively coupled to, and configured to serve, one or more destination terminal devices (not shown).

For example, in one embodiment, the source terminal devices may include one or more content servers configured to stream audio and/or video content data packets over a network, and the destination terminal devices may include one or more end user devices (e.g., UEs), such as mobile devices or other personal computing devices, configured to consume the streamed data packets and present the content to users.

In operation, the source router 102 may receive data packets from the one or more source terminal devices, destined for the one or more destination terminal devices. And the source router 102 may transmit the data packets, over the switching network 104, to the destination terminal devices.

The switching network 104 may include a number of transit nodes 108 intermediate the source router 102 and the destination router 106. The transit nodes 108 may be, for example, MPLS routers or other suitable types of routers. The example in FIG. 1 shows six different transit nodes 108, three of which are labeled as transit nodes 108a, 108b, 108c. But the switching network may have any number or type of transit nodes 108, depending on the desired implementation.

The transit nodes 108 may receive data packets from the source router 102 and transmit those data packets among each other, across the switching network 104, to the destination router 106. The data packets may follow certain paths through the transit nodes 108 to traverse the switching network 104. For example, the transit nodes 108 may maintain a routing table that lists routes to particular destinations in the network 100. And the transit nodes 108 may transmit the data packets along the routes indicated by the routing table for the particular destinations of those data packets. The routing table may contain information associated with the routes, such as a distance metric or a cost metric associated with each route.

It is to be appreciated that the source router 102, the destination router 106, and the transit nodes 108 may be implemented as any suitable combination of software and hardware computing components known in the art for receiving, transmitting, and routing data packets over a network. For example, the source router 102, the destination router 106, and the transit nodes 108 may have one or more processors, memories, communication interfaces, or other computing elements. The processors may be configured to access the memory in order to retrieve executable instructions that, when executed by the processors, cause the processors to perform the functions described herein.

Figure 2:
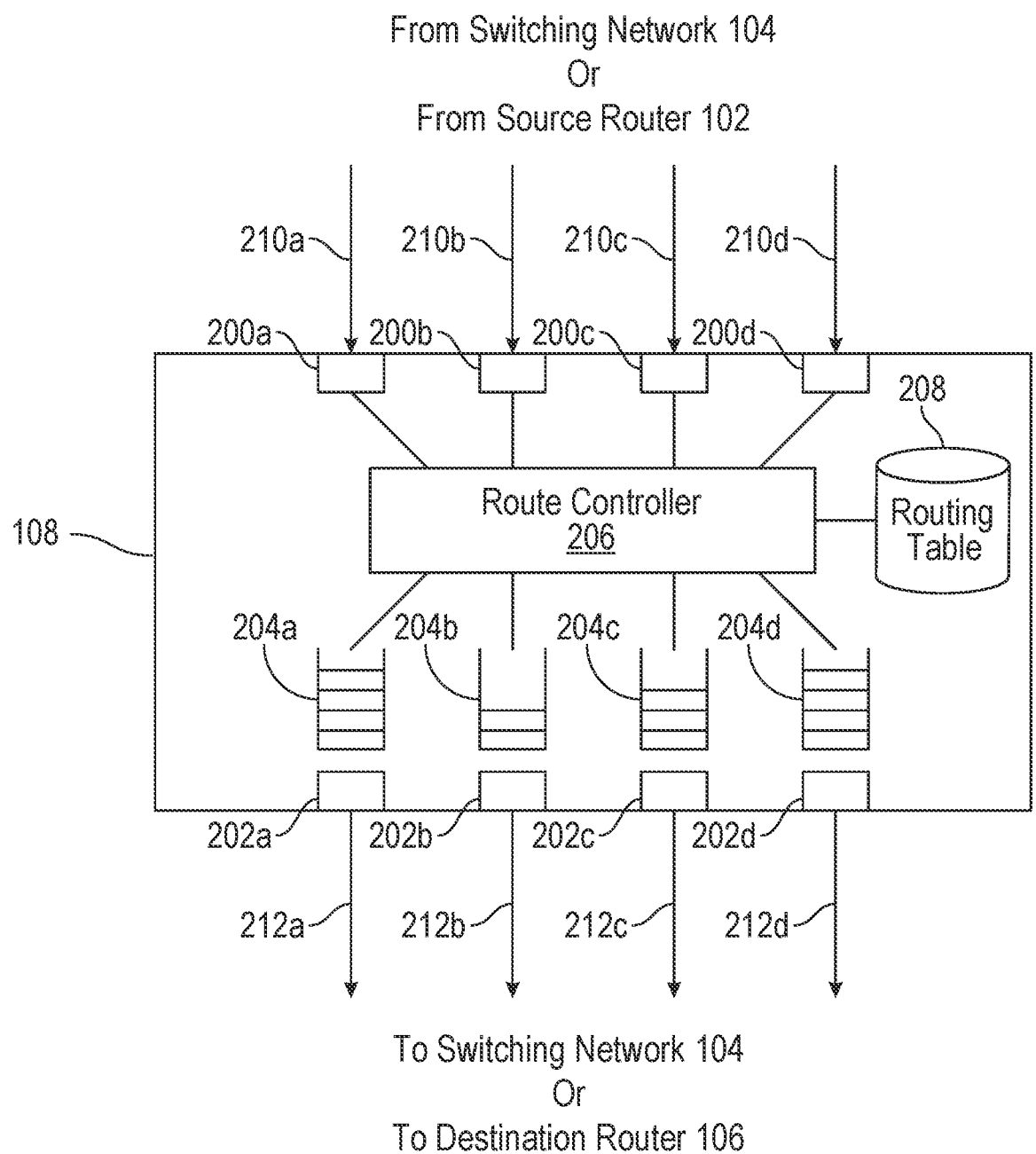
FIG. 2 shows a representation of a router in the switching network of FIG. 1.

FIG. 2 shows a representation of a transit node 108 of the switching network 104 in further detail. The transit node 108 may have input interfaces 200, output interfaces 202, output interface queues 204, a route controller 206, and a routing table 208, among other elements. Although the example of FIG. 2 shows the transit node 108 as having four input interfaces 200 and four output interfaces 202, any number or combination of input and output interfaces may be used, depending on the particular implementation.

Each input interface 200a-d may be connected to an output interface of a respective other transit node 108 in the switching network 104, or to the source router 102, via a respective input data link 210a-d. And, accordingly, each input interface 200a-d may receive, on its respective input data link 210a-d and from the respective other transit node 108 or from the source router 102, data packets traversing the switching network 104.

Similarly, each output interface 202a-d may be connected to an input interface of a respective other transit node 108 in the switching network 104, or to a respective input interface of the destination router 106, via a respective output data link 212a-d. And, accordingly, each output interface 202a-d may transmit received data packets, in the process of traversing the switching network 104, to the respective other transit node 108, or to the destination router 106, on its respective output interface 202a-d.

The output interface queues 204a-d may store data packets awaiting transmission on respective output interfaces 202a-d. The output interface queues 204a-d, for example, may be allocated in volatile or non-volatile memory of the transit node 108. During operation, a topology change, such as a failure of a certain transit node, may cause congestion to build within the switching network 104. This may reduce the capacity, or the available bandwidth, of a particular output interface 202, such as interface 202d, to transmit data packets on its respective output data link 212, such as corresponding link 212d.

The demand for transmission capacity on the affected output interface 202d, however, may remain the same despite the topology change. This demand-capacity differential may cause the respective output interface queue 204d to accumulate data packets waiting to be transmitted onto the output data link 212d via the output interface 202d. The output interface queue 204d may continue to fill with data packets until the demand-capacity differential at output interface 202*d* is alleviated, either using rerouting the techniques describe herein or upon repair of the failed transit node 108.

The route controller 206 may analyze data packets received at the input interfaces 200*a-d* and determine to which output interface 202*a-d* to assign the received packets for continued transmission. For example, when a data packet is received on an input interface 200*a-d*, the route controller 206 may look up the destination address, contained in a header of the data packet, in the routing table 208. The routing table 208 may have an entry for the destination address, and that entry may list a corresponding output interface 202*a-d* on which to transmit a data packet headed for the particular destination address. The route controller 206 may then assign the data packet to the particular output interface 202*a-d* identified in the routing table entry. If the identified output interface 202*a-d* is occupied, the route controller 206 may enter the data packet in the output interface queue 204*a-d* corresponding to the identified output interface 202*a-d* where the data packet waits to be transmitted by the output interface 202*a-d*.

Consistent with the disclosed embodiments, the route controller 206 may be configured to manage the output interface queues 204*a-d* in response to increases in demand for, or decreases in the capacity of, the output interfaces 202*a-d* to transmit data packets on their respective output data links 212*a-d*. Surges in demand could be caused, for example, by a large number of destination terminal devices requesting services of the source terminal devices (e.g., streaming content) simultaneously or around the same time. For example, a popular online streaming content provider may release a highly-anticipated, new season of episodes of a television series on a certain day at a certain time, and many users at once may attempt to stream the new season. On the other hand, decreases in capacity could be caused, for example, by downstream topology changes, such as a transit node 108 within the switching network 104 failing due to a power outage.

Consistent with this disclosure, the route controller 206 may be configured to monitor output interface queues 204*a-d*. And, based on the status of the output interface queues 204*a-d*, the route controller 206 may select alternate paths on which to transmit the data packets in the event of such surges in demand for, or such drops in capacity of, the associated output interfaces 202*a-d*. In one embodiment, these alternate paths may be loop-free alternate (LFA) paths, meaning that the next transit node 108 on the alternate route has available a path to the destination that does not requiring returning to the same transit node 108 experiencing the congestion.

The table below shows an example of a routing table 208 consistent with the disclosed embodiments:

Routing Table

| Destination Address | Primary Output Interface | Metric for Primary Route | Alternate Output Interface | Metric for Alternate Route |
|---|---|---|---|---|
| 192.166.0.0 | A | ... | B | ... |
| 192.166.0.1 | B | ... | C | ... |
| 192.166.0.2 | C | ... | D | ... |
| 129.444.3.5 | D | ... | A | ... |
| 187.556.2.0 | A | ... | C | ... |

As shown in the table above, the routing table 208 may store entries that map destination addresses of data packets to corresponding primary output interfaces (second column). The primary output interfaces may be the output interfaces 202*a-d* (i.e., primary routes) to which the route controller 206 normally assigns received data packets destined for those particular addresses when alternate routes are not activated. The routing table 208 may also map the destination addresses to corresponding metrics (third column) for the primary routes. In one embodiment, the metric may be a number representing a cost associated with the particular primary route. The cost may correspond to the latency to the destination address associated with that primary route.

Additionally, the entries in the routing table 208 may map the destination addresses to corresponding alternate output interfaces (fourth column). The alternate output interfaces may be the output interfaces 202*a-d* (i.e., alternate routes) to which the route controller 206 alternately assigns received data packets destined for those addresses when alternate routes are activated for them. Likewise, the routing table 208 may also map the destination addresses to corresponding metrics (fifth column) for the alternate routes. As with the third column, the metrics in the third column may be numbers representing costs associated with the particular alternate routes. And the cost may correspond to the latency to the destination address over the corresponding alternate route.

To give an example based on the table above, as shown in the first entry, the route controller 206 may normally assign data packets having the destination address 192.166.0.0 to the output interface 202*a* (output interface A). And when an alternate route for the destination address 192.166.0.0 has been activated, as explained below, the route controller 206 may assign data packets having the destination address 192.166.0.0 to the output interface 202*b* (output interface B). In another example, the second entry of the table indicates that the route controller 206 may normally assign data packets having the destination address 192.166.0.1 to the output interface 202*b* (output interface B). But when an alternate route has been activated for that destination address, the route controller 206 assigns those data packets to the output interface 202*c* (output interface C) instead.

In one embodiment, the primary and alternate routes indicated in the routing table 208 may be precomputed. For example, as known in the art, the route controller 206 of each transit node 108 may apply a shortest-path calculation from itself to the destination for each destination address in the routing table 208. And the route controller 206 may assign the output interface 202*a-d* corresponding to the shortest path as the primary output interface (second column) shown in the table above.

The route controller 206 may compute the alternate routes in the routing table 208 in a number of different ways. For example, using the shortest-path calculation, the route controller 206 may assign the output interface 202*a-d* corresponding to the second-shortest path as the alternate output interface (third column) as shown in the table above. As another example, the route controller 206 may compute the shortest path to the destination address from its neighboring transit nodes 108 and may assign the output interface 202*a-d* connected to the neighboring transit node 108 that has the shortest distance to the destination address as the alternate output interface (third column). As another example, the route controller 206 may determine the shortest path from itself to each of its neighboring transit nodes 108 and assign the output interface 202*a-d* to which the closest neighboring transit node 108 is connected as the alternate output interface (third column). In yet another example, the route controller 206 may randomly assign the alternate output interface as any output interface 202a-d of the transit node 108 other than the primary output interface for the destination address.

During operation, the router controller 206 may be configured to determine whether to activate an alternate route for any destination address on the routing table 208. In one embodiment, the route controller 206 may determine whether to activate alternate routes based on data storage statuses of the output interface queues 204a-d of the corresponding output interfaces 202a-d. For example, the route controller 206 may monitor the amount data stored in each output interface queue 204a-d. And when the amount of data stored in an output interface queue 204a-d reaches a threshold below the storage capacity of that output interface queue 204a-d (e.g., 70%), the route controller 206 may determine to activate an alternate route for one or more destination addresses for which that output interface 202a-d serves as the primary output interface (column two in the routing table above).

For example, continuing with the example above, a topology change or traffic surge in the switching network 104 may cause the output interface queue 204a for the output interface queue 202a (Interface A) to fill. When the output interface 202a reaches the storage threshold, the route controller 206 may activate an alternate route for one or more destination addresses for which the output interface 202a (Interface A) serves as the primary output interface. In this example, the routing table 208 indicates that the output interface 202a (Interface A) serves as the primary for two destination addresses: 192.166.0.0 and 187.556.2.0. Thus, in one example, the route controller 206 may activate the alternate path through the output interface 202b (Interface B) for data packets destined for 192.166.0.0. This results in a load-sharing arrangement between output interface 202a (Interface A) and output interface 202b (Interface B) in which some of output interface 202a's traffic burden is offloaded to output interface 202b to alleviate the congestion building at output interface 202a.

Alternatively, or additionally, the route controller 206 may activate the alternate path through the output interface 202c (Interface C) for data packets destined for 187.556.2.0. Activating both alternate routes results in a load-sharing arrangement between output interface 202a (Interface A), output interface 202b (Interface B), and output interface 202c (Interface C) in which one portion of output interface 202a's traffic burden is offloaded to output interface 202b and another portion of output interface 202a's burden if offloaded to output interface 202c.

The route controller 206 may be configured to select a destination address for which to activate an alternate path. In one embodiment, the route controller 206 may select, from among all the destination addresses for which the output interface 202a (Interface A) serves as the primary output interface, the destination address that has the smallest metric value (fifth column). In other embodiments, the route controller 206 may choose the destination address assigned to the output interface 202a (Interface A) requiring the smallest or largest amount of bandwidth.

In some embodiments, the route controller 206 may be configured to activate alternate routes in stages. For instance, continuing with the example above, the route controller 206 may initially activate a first alternate path through the output interface 202b (Interface B) for data packets destined for 192.166.0.0 when the output interface queue 204a fills to the threshold. The router controller 206 may then continue to monitor the output interface queue 204a of Interface A. If the amount of data in output interface queue 204a remains the same or continues to increase, the route controller 206 may activate a second alternate path through the output interface 202c (Interface C) for data packets destined for 187.556.2.0.

When activating an alternate route, the route controller 206 may establish a tunnel between the alternate output interface (fourth column) identified in the routing table 208 and the particular destination address. Thereafter, while the alternate path remains active, the route controller 206 may transmit data packets destined for the destination address over that tunnel. The route controller 206 may establish an IP tunnel for the alternate route through packet-encapsulation techniques known in the art. Continuing with the example above, when activating the alternate route for the destination address 192.166.0.0 (first entry), the route controller 206 may establish an IP tunnel between the output interface 202b (Interface B) indicated in the table (third column) and the destination address. And, while the alternate route is activated, the route controller 206 may transmit data packets designed for 192.166.0.0 over that tunnel using Interface B instead of over the primary output interface 202a, Interface A (second column).

The route controller 206 may be configured to deactivate an alternate path based on the status of the output interface queues 204a-d. In one embodiment, once the amount of data stored in the output interface queue 204a-d corresponding to the original, primary output interface 202a-d of the currently-active alternate path falls to a second threshold of its storage capacity (e.g., 20%), the route controller 206 may deactivate the alternate path. Continuing with the example above, assume that the alternate path through output interface 202b (Interface B) for the destination address 192.166.0.0 is currently active. As congestion at the primary output interface 202a (Interface A) reduces, the amount of data stored in the output interface queue 204a also falls. And once the amount of data reaches the second threshold, the route controller 206 may deactivate the alternate path for destination address 192.166.0.0 through the alternate output interface 202b (Interface B). For example, the route controller 206 may deconstruct the tunnel between the alternate output interface 202b (Interface B) and the destination address 192.166.0.0. Thereafter, the route controller 206 may resume transmitting data packets destined for the address 192.166.0.0 over the primary output interface 202a (Interface A).

It is to be appreciated that the route controller 206 may use metrics other than the amount of data stored in the output interface queues 204a-d to activate or deactivate alternate routes. For example, instead of, or in addition to, activating an alternate route when the amount of data stored in an output interface queue 204a-d reaches a threshold, the route controller 206 may do so based on the rate at which the output interface queues 204a-d fill with data. For example, in one embodiment, a sudden traffic surge may cause the rate at which output interface queue 204d (Interface D) stores data to increase. And, when that fill rate reaches a threshold (e.g., +10 MB/s), and optionally remains at or above that threshold for a period of time, the route controller 206 may activate an alternate path.

Likewise, instead of deactivating an alternate path when the amount of data stored in an output interface queue 204a-d falls to a certain amount, the route controller 206 may do so when the rate at which the output interface queue 204a-d stores data falls to a second threshold (e.g., 0 MB/s or −10 MB/s) below the threshold at which the alternate route was activated and, optionally, remains at or below the second threshold for a period of time. In still other embodiments, the route controller 206 may deactivate the alternate route, for example, after a set period of time regardless of the status of the primary output interface queue 204a-d.

Figure 3:
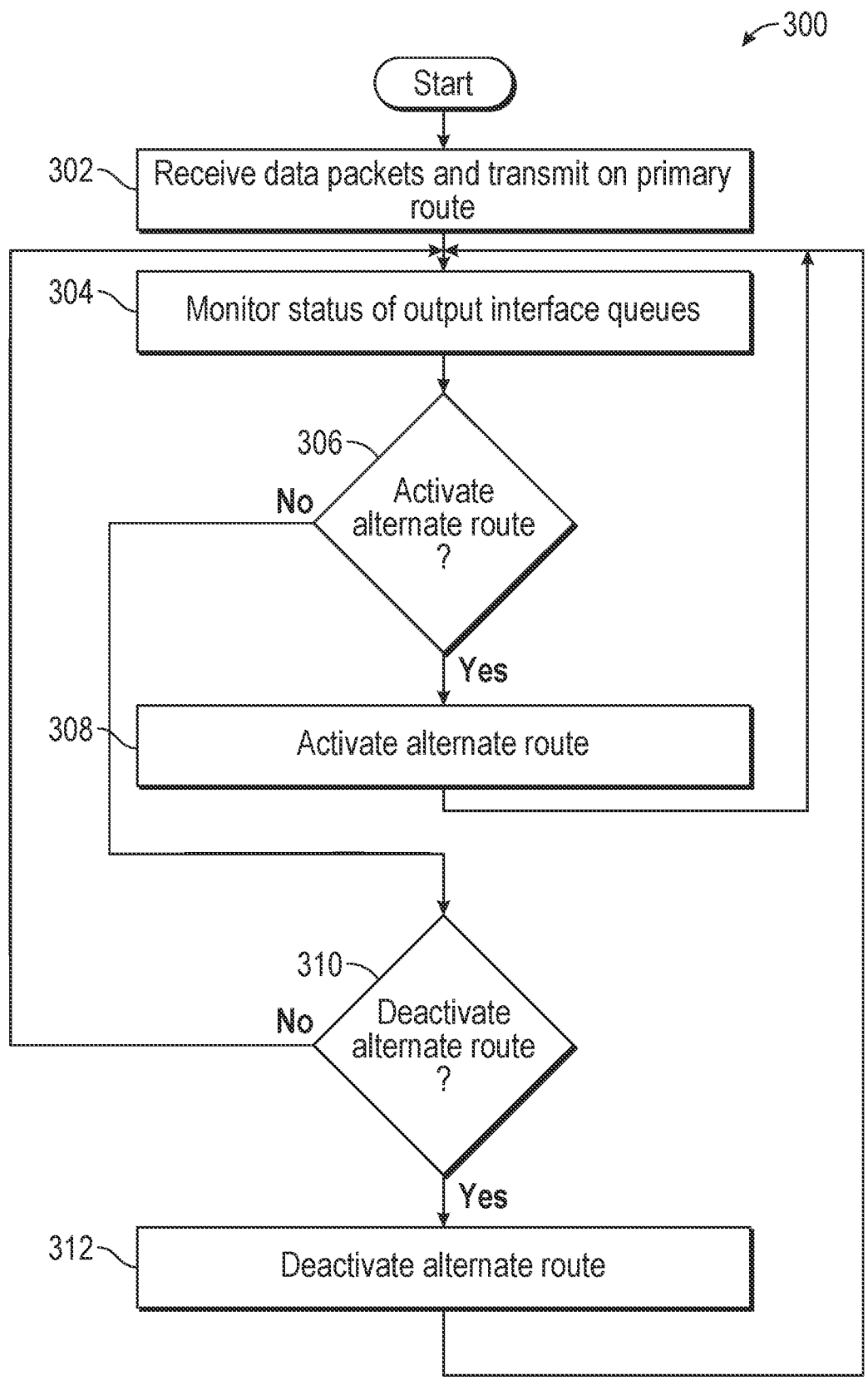
FIG. 3 shows a flowchart of an exemplary method performed by the router of FIG. 2 for managing routes in the switching network, consistent with the disclosed embodiments.

FIG. 3 shows a flowchart representing a method 300 of managing routes at a router in a network. The method 300 may be performed by each transit node 108 in the switching network 104. In particular, the route controller 206 of the transit node 108 may perform the method 300. The router controller 206 may comprise dedicated computer hardware, or a combination of hardware and software (e.g., one or more processors executing instructions stored in memory), configured to perform the method 300.

In step 302, the transit node 108 may receive data packets over the network 100. The transit node 108 may receive the data packets at its input interfaces 200a-d over the data links 110 to other transit nodes 108 on the switching network 104. Additionally, the transit node 108 may transmit the received data packets on their primary routes indicated by the routing table 208. Specifically, the route controller 206 may look up the destination addresses of the data packets in the routing table 208 and assign the data packets to the primary output interfaces 202a-d (second column) corresponding to the destination addresses for transmission.

In step 304, the route controller 206 may monitor the data storage statuses of the output interface queues 204a-d. For example, as discussed above, the route controller 206 may monitor the amounts of data respectively stored in the output interface queues 204a-d, the rate at which stored data accumulates in the output interface queues 204a-d, or other such metrics.

In step 306, the route controller 206 may determine, based on the data storage statuses of the output interface queues 204a-d, whether to activate an alternate route for any destination address(es) in the routing table 208. For example, as discussed above, the route controller 206 may determine whether the amount of data stored in any of the output interface queues 204a-d reaches a threshold (e.g., 70% of the queue's storage capacity). Alternatively, or additionally, the route controller 206 may determine whether the rate at which any output interface queue 204a-d accumulates stored data reaches a threshold (e.g., 10 MB/s). If not, the route controller 206 may determine not to activate an alternate route and return to step 304. But, if so, the route controller 206 may determine to activate an alternate route to alleviate congestion building at the output interface 202a-d associated with the filling output interface queue 204a-d and proceed to step 308.

In step 308, the route controller 206 may activate an alternate route. In particular, the route controller 206 may identify the destination address(es) assigned in the routing table 208, as a primary output interface, to the output interface 202a-d whose queue 204a-d's status caused a "yes" result in step 304. The route controller 206 may then activate the alternate route for some or all of the identified destination addresses, such by establishing a tunnel between the alternate output interface(s) (fourth column) listed in the routing table 208 for those destination addresses.

For example, in step 306, the route controller 206 may have determined that the amount of stored data, or the rate at which data is accumulating, in the output interface queue 204a for the output interface 202a (Interface A) has reached the threshold. The route controller 206 may then identify the destination address(es) in the routing table 208 assigned to the output interface 202a (Interface A) as a primary interface (second column). Continuing with the example above, these would be the destination addresses 192.166.0.0 and 187.556.2.0, as they are assigned to Interface A as a primary output interface. The route controller 206 may then activate an alternate route for one or more of these destination addresses. For example, if no alternate route is currently active for the output interface 202a (Interface A), the route controller 206 may activate an alternative route for the destination address 192.166.0.0, which corresponds to the output interface 202b (fourth column) as listed in the routing table 208. As discussed above, the route controller 206 may select the destination address for which to activate an alternate route based on any criteria, such the destination address, among all the destination addresses for which the output interface 202a (Interface A) serves as the primary output interface, that has the smallest metric value (fifth column). Alternatively, the route controller 206 may choose the destination address assigned to the output interface 202a (Interface A) requiring the smallest or largest amount of bandwidth.

In some cases, however, the route controller 206 may have already activated one of the alternate routes for a primary output interface 202a-d. For example, in a first pass through the method 300, the route controller 206 may have activated the alternate route for the destination address 192.166.0.0, but this measure may not have sufficiently alleviated the congestion at the primary interface 202a (Interface A). Then, in a later pass through the method 300, the route controller 206 may determine in step 306 to activate a second alternate path for data packets having a destination address assigned to the output interface 202a (Interface A). Continuing with the example, the route controller may now also activate the alternate route for the destination address 187.556.2.0, as that address is also assigned to the output interface 202a (Interface A) as a primary interface. Following step 308, the route controller 206 may return to step 304.

In step 310, the route controller 206 may determine, based on the data storage statuses of the output interface queues 204a-d, whether to deactivate any currently-active alternate route for any destination address(es) in the routing table 208. For example, as discussed above, the route controller 206 may determine whether the amount of data stored in any of the output interface queues 204a-d drops to a second threshold (e.g., 20% of the queue's storage capacity). Alternatively, or additionally, the route controller 206 may determine whether the rate at which any output interface queue 204a-d accumulates stored data reduces to a second threshold (e.g., 0 MB/s or −10 MB/s). For example, the route controller 206 may determine whether that queue is no longer adding data packets or is now eliminating data packets at a certain rate. If not, the route controller may return to step 304.

If the route controller 206 determines in step 310 to deactivate an active alternate route, the route controller 206 may do so in step 312. For example, the route controller 206 may select a destination address assigned to the output interface 202a-d whose queue 204a-d's data storage status resulted in the "yes" result in step 310. Continuing with the example above, assume that the alternate route for the destination address 192.166.0.0 is active. In step 310, the route controller 206 may determine that that the output interface queue 204a for this destination address's primary output interface—the output interface 202a (Interface A)—has a status that no longer warrants using the alternate route. For example, the amount of data stored, or that rate at which data is stored, in the output interface queue 204a may have dropped to the second threshold. In this case, the route controller 206 may deactivate the alternate route by resuming transmission of data packets having the destination address 192.166.0.0 on the primary output interface 202a (Interface A) and stopping their transmission on the interface 202b (Interface B). For example, the route controller 206 may deconstruct the tunnel established between Interface A and the destination address 192.166.0.0.

Figure 4:
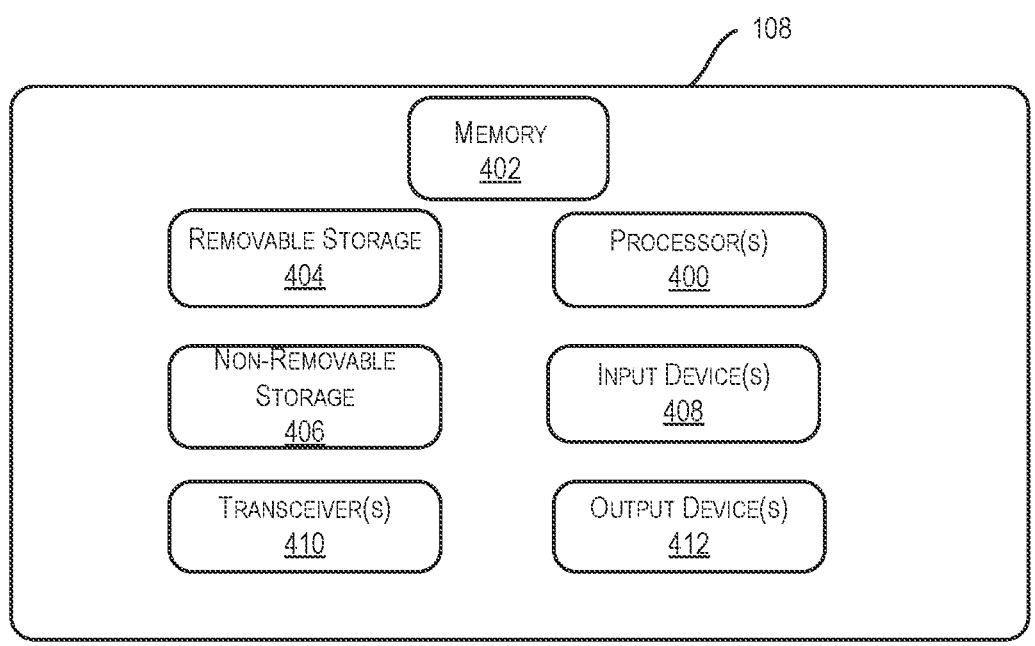
FIG. 4 shows a high-level components of the router of FIG. 2

FIG. 4 shows basic, high-level components of a transit node 108 that may embody the aspects of the transit node 108 discussed above with respect to FIG. 2. The transit node 108 may include processor(s) 400 and memory 402. Depending on the exact configuration and type of computing device, the memory 402 may be volatile (such as RAM), non-volatile (such as ROM, flash memory, etc.) or some combination of the two.

In some examples, the processor(s) 400 is a central processing unit (CPU) or other processing unit or component known in the art. Furthermore, the processor(s) 400 may include any number of processors and/or processing cores. The processor(s) 400 is configured to retrieve and execute instructions from the memory 402. The processor(s), executing the instructions, may perform the functions discussed above with respect to the route controller 206.

The memory 204 can also be described as non-transitory computer-readable media or machine-readable storage memory and may include removable and non-removable media implemented in any method or technology for storage of information, such as computer executable instructions, data structures, program modules, or other data. The memory 204 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 402 may include, among other information, the information in the output interface queues 204a-d and the routing table 208, discussed above.

The transit node 108 also includes additional data storage devices (removable and/or non-removable) such as, for example, magnetic disks, optical disks, or tape. Such additional storage is illustrated in FIG. 4 by removable storage 404 and non-removable storage 406. Tangible computer-readable media can include volatile and non-volatile, removable and non-removable media implemented in any method or technology for storage of information, such as computer readable instructions, data structures, program modules, or other data for performing the disclosed functions of the transit node 108. The memory 402, the removable storage 404 and the non-removable storage 406 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the transit node 108. Any such tangible computer-readable media can be part of the transit node 108.

The memory 402, the removable storage 404, and/or the non-removable storage 406 may in some cases include storage media used to transfer or distribute instructions, applications, and/or data. In some cases, the memory 402, the removable storage 404, and/or the non-removable storage 406 may include data storage that is accessed remotely, such as network-attached storage that the transit 108 accesses over some type of data communications network.

In various examples, any or all of the memory 402, the removable storage 404, and/or the non-removable storage 406 may store programming instructions that, when executed, implement some or all of the function functionality described herein.

The transit node 108 also can include input device(s) 408, such as a keypad, a cursor control, a touch-sensitive display, voice input device, etc., and output device(s) 412 such as a display, speakers, printers, etc. These devices are well known in the art and need not be discussed at length here.

As illustrated in FIG. 4, the transit node 108 may also include one or more wired or wireless transceiver(s) 410. For example, the transceiver(s) 410 can include a network interface card (NIC), a network adapter, a LAN adapter, or a physical, virtual, or logical address to connect to various networks, devices, or components illustrated in figures herein. To increase throughput when exchanging wireless data, the transceiver(s) 410 can utilize multiple-input/multiple-output (MIMO) technology. The transceiver(s) 410 can comprise any sort of wireless transceivers capable of engaging in wireless, radio frequency (RF) communication. The transceiver(s) 410 can also include other wireless modems, such as a modem for engaging in Wi-Fi, WiMAX, Bluetooth, infrared communication, and the like.

The disclosed methods and systems may be used in any network of nodes that routes data packets from a source to a destination. For examples, the methods and systems can be used in a second generation (2G), third generation (3G), fourth generation (4G), fifth generation (5G), or other network. The disclosed techniques may improve upon prior solutions in various ways. For example, the disclose techniques may be proactive in the sense that they activate an alternate route for traffic before a link fails, and an interface at the node starts dropping packets, by monitoring the associated interface queues as discussed above. As a result, network performance, quality of service, and customer experience may be improved relative to existing solutions.

Additionally, the disclosed solutions may be applied locally and do not require network-wide topology information from the other nodes in the switching network. For example, as discussed, the solutions leverage local knowledge of the status of a node's interface queues and use that local information to select a portion of traffic to reroute to the same destination through an interface other than the one that may be approaching a potential failure (e.g., overflow and dropped packets). Thus, the disclosed solutions do not require network-wide signaling.

In view of the foregoing, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A router in a switching network, the router comprising:
one or more input interfaces communicatively coupled to respective one or more other routers in the switching network;

first and second output interfaces communicatively coupled to respective first and second other routers in the switching network;

first and second output interface queues respectively associated with the first and second output interfaces, the first and second output interface queues being configured to store data packets awaiting transmission respectively on the first and second output interfaces;

a routing table mapping first and second destination addresses to the first output interface as a primary output interface and mapping the first destination address to the second output interface as an alternate output interface;

a route controller configured to:
receive, from the one or more input interfaces, data packets having one of the first destination address or the second destination address;

assign, using the routing table, the data packets having one of the first destination address or the second destination address to the primary output interface for transmission on the switching network, the primary output interface being the first output interface;

monitor a data storage status of the first output interface queue; and determine, based on the data storage status, whether to activate an alternate route for transmitting data packets having the first destination address over the switching network, the alternate route using the alternate output interface instead of the primary output interface, the alternate output interface being the second output interface;

activate the alternate route based on a determination to activate the alternate route;

continue to monitor the data storage status of the first output interface queue following activation of the alternate route to generate a second monitored data storage status;

determine, based on the second monitored data storage status, whether to deactivate the alternate route; and deactivate the alternate route based on a determination to deactivate the alternate route.

2. The router of claim 1, wherein following activating the alternate route, the route controller is further configured to:
receive, from the one or more input interfaces, further data packets having the first destination address; and
assign, using the routing table, the further data packets to the second output interface for transmission on the switching network rather than to the first output interface.

3. The router of claim 1, wherein to activate the alternate route, the route controller is further configured to establish a tunnel between the second output interface and the first destination address.

4. The router of claim 1, wherein to determine whether to activate the alternate route, the route controller is configured to determine whether an amount of data stored in the first output interface queue reaches a threshold.

5. The router of claim 1, wherein to determine whether to activate the alternate route, the route controller is configured to determine whether a rate at which stored data accumulates in the first output interface queue reaches a threshold.

6. The router of claim 1, wherein following deactivating the alternate route, the route controller is further configured to:
receive, from the one or more input interfaces, second further data packets having the first destination address; and assign, using the routing table, the second further data packets to the first output interface for transmission on the switching network rather than to the second output interface.

7. The router of claim 1, wherein to deactivate the alternate route, the route controller is further configured to deconstruct a tunnel established between the second output interface and the first destination address.

8. The router of claim 1, wherein to determine whether to deactivate the alternate route, the route controller is configured to determine whether an amount of data stored in the first output interface queue reduces to a threshold.

9. The router of claim 1, wherein to determine whether to deactivate the alternate route, the route controller is configured to determine whether a rate at which stored data accumulates in the first output interface queue reduces to a threshold.

10. A method for routing data in a switching network, the method comprising:
communicatively coupling one or more input interfaces of the router to respective one or more other routers in the switching network;

communicatively coupling first and second output interfaces of the router to respective first and second other routers in the switching network;

providing first and second output interface queues respectively associated with the first and second output interfaces, the first and second output interface queues being configured to store data packets awaiting transmission respectively on the first and second output interfaces;

providing a routing table mapping first and second destination addresses to the first output interface as a primary output interface and mapping the first destination address to the second output interface as an alternate output interface;

performing, by a route controller of the router, the following:
receiving, from the one or more input interfaces, data packets having one of the first destination address or the second destination address;

assigning, using the routing table, the data packets having one of the first destination address or the second destination address to the primary output interface for transmission on the switching network, the primary output interface being the first output interface;

monitoring a data storage status of the first output interface queue; and determining, based on the monitored data storage status, whether to activate an alternate route for transmitting data packets having the first destination address over the switching network, the alternate route using the alternate output interface instead of the primary interface, the alternate output interface being the second output interface;

activating the alternate route based on a determination to activate the alternate route;

continuing by the route controller, to monitor the data storage status of the first output interface queue following activation of the alternate route to generate a second monitored data storage status;

determining, by the route controller based on the second monitored data storage status, whether to deactivate the alternate route; and deactivating, by the route controller, the alternate route based on a determination to deactivate the alternate route.

11. The method of claim 10, further comprising, following activating the alternate route:
  receiving, by the route controller from the one or more input interfaces, further data packets having the first destination address; and
  assigning, by the route controller using the routing table, the further data packets to the second output interface for transmission on the switching network rather than to the first output interface.

12. The method of claim 10, wherein activating the alternate route includes establishing a tunnel between the second output interface and the first destination address.

13. The method of claim 10, wherein determining whether to activate the alternate route includes determining whether an amount of data stored in the first output interface queue reaches a threshold.

14. The method of claim 10, wherein determining whether to activate the alternate route includes determining whether a rate at which stored data accumulates in the first output interface queue reaches a threshold.

15. The method of claim 10, further comprising, following deactivating the alternate route:
  receiving, by the route controller from the one or more input interfaces, second further data packets having the first destination address; and
  assigning, using the routing table, the second further data packets to the first output interface for transmission on the switching network rather than to the second output interface.

16. The method of claim 10, wherein deactivating the alternate route includes deconstructing a tunnel established between the second output interface and the first destination address.

17. The method of claim 10, wherein to determining whether to deactivate the alternate route includes determining at least one of whether an amount of data stored in the first output interface queue, or whether a rate at which stored data accumulates in the first output interface queue, reduces to a threshold.

18. One or more computer-readable storage media storing instructions that, when executed by a processor, cause the processor to perform a method of routing data in a switching network, the method comprising:
  communicatively coupling one or more input interfaces of the router to respective one or more other routers in the switching network;
  communicatively coupling first and second output interfaces of the router to respective first and second other routers in the switching network;
  providing first and second output interface queues respectively associated with the first and second output interfaces, the first and second output interface queues being configured to store data packets awaiting transmission respectively on the first and second output interfaces;
  providing a routing table mapping first and second destination addresses to the first output interface as a primary output interface and mapping the first destination address to the second output interface as an alternate output interface;
  performing, by a route controller of the router, the following:
    receiving, from the one or more input interfaces, data packets having one of the first destination address or the second destination address;
    assigning, using the routing table, the data packets having one of the first destination address or the second destination address to the primary output interface for transmission on the switching network, the primary output interface being the first output interface;
    monitoring a data storage status of the first output interface queue; and
    determining, based on the monitored data storage status, whether to activate an alternate route for transmitting data packets having the first destination address over the switching network, the alternate route using the alternate output interface instead of the primary interface, the alternate output interface being the second output interface; and
    activating the alternate route based on a determination to activate the alternate route;
    continuing, by the route controller, to monitor the data storage status of the first output interface queue following activation of the alternate route to generate a second monitored data storage status;
    determining, by the route controller based on the second monitored data storage status, whether to deactivate the alternate route; and
    deactivating, by the route controller, the alternate route based on a determination to deactivate the alternate route.

19. The one or more computer-readable storage media of claim 18, further comprising, following activating the alternate route:
  receiving, by the route controller from the one or more input interfaces, further data packets having the second destination address; and
  assigning, by the route controller using the routing table, the further data packets to the first output interface for transmission on the switching network rather than to the second output interface.

20. The one or more computer-readable storage media of claim 18, wherein determining whether to activate the alternate route includes determining whether an amount of data stored in the first output interface queue reaches a threshold;
  the route controller of the router, following activating the alternate route and prior to generating the second monitored data storage status, further performing the following:
    continuing, by the route controller, to monitor the data storage status of the first output interface queue following activation of the alternate route to generate a third monitored data storage status;
    determining, based on the third monitored data storage status, whether to activate a second alternate route for transmitting data packets having the second destination address over the switching network, the second alternate route using a second alternate output interface instead of the primary interface, the alternate output interface being a third output interface; and
    activating the second alternate route based on a determination to activate the second alternate route;
    receiving, by the route controller from the one or more input interfaces and following the activating of the second alternative route, further data packets having the second destination address; and
    assigning, by the route controller using the routing table, the further data packets to the first output interface for transmission on the switching network rather than to the second output interface.

* * * * *